Jan. 28, 1941.  G. M. ETNYRE  2,230,076
MEANS FOR REMOVING HEAVY MATERIALS FROM A TANK CAR OR THE LIKE
Filed Jan. 17, 1938   3 Sheets-Sheet 1
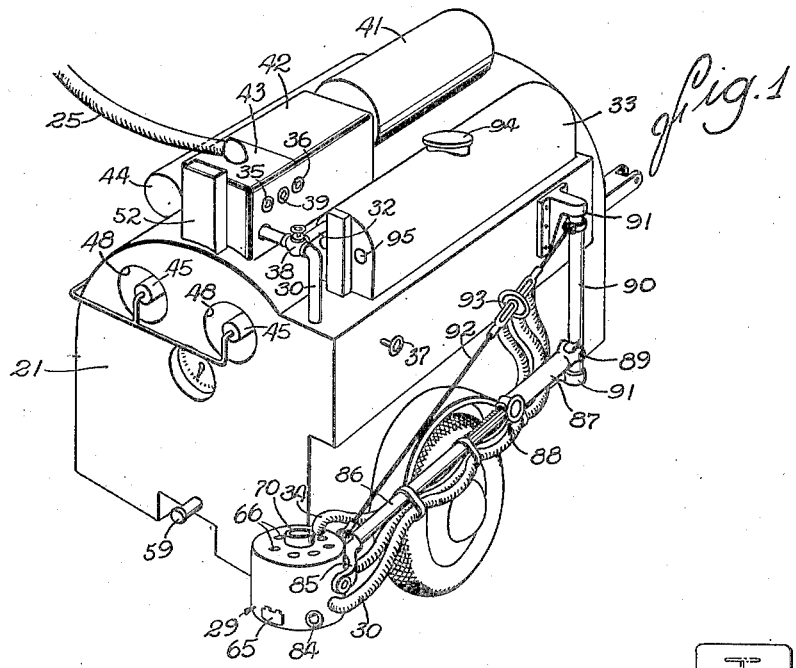
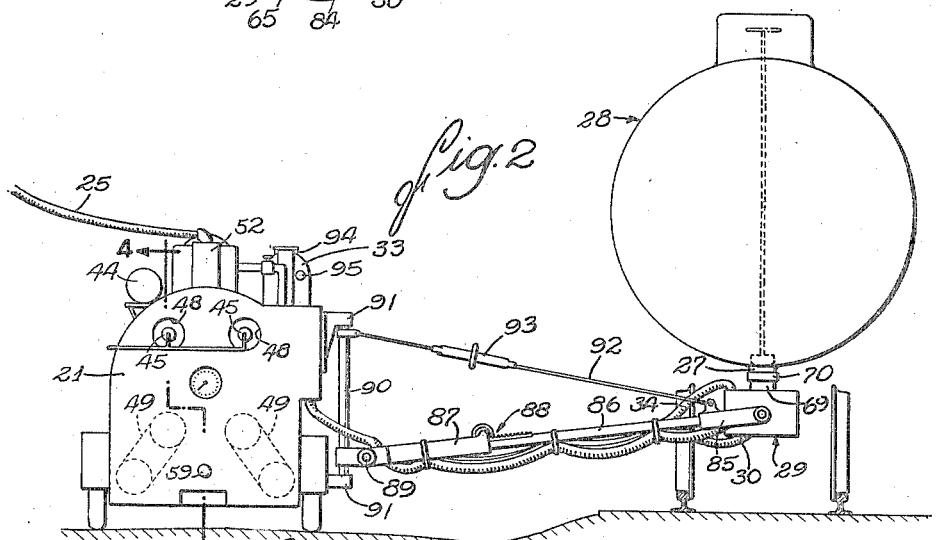
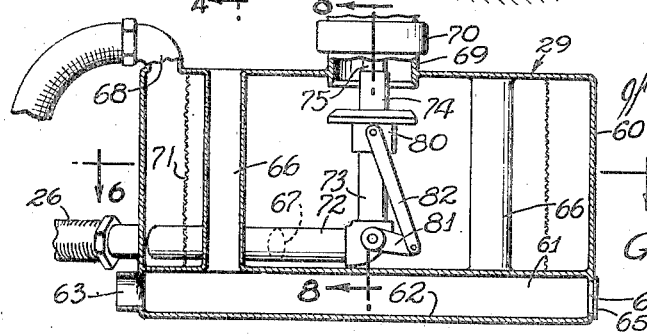
INVENTOR
George M. Etnyre
ATTORNEYS Jan. 28, 1941. G. M. ETNYRE 2,230,076
MEANS FOR REMOVING HEAVY MATERIALS FROM A TANK CAR OR THE LIKE
Filed Jan. 17, 1938 3 Sheets-Sheet 2
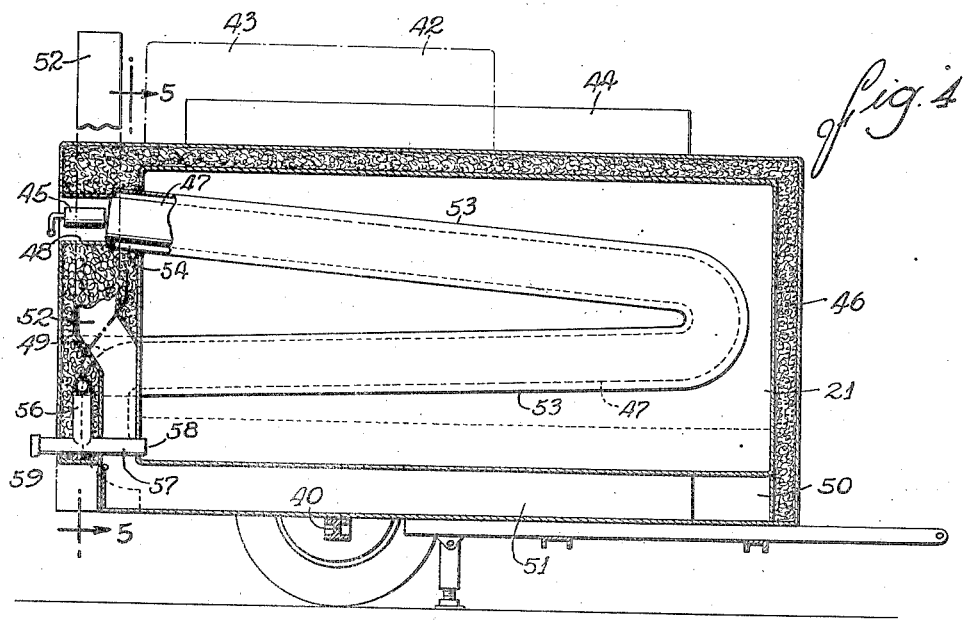
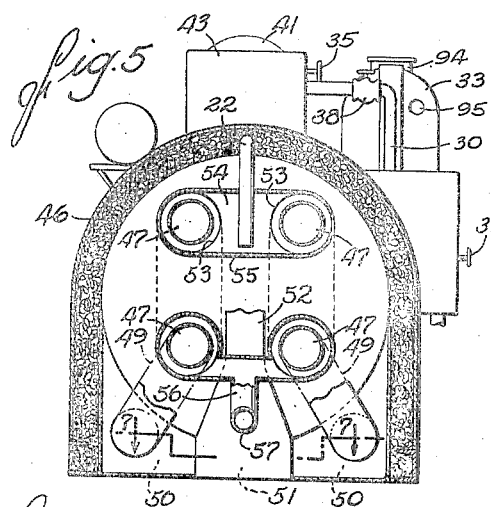
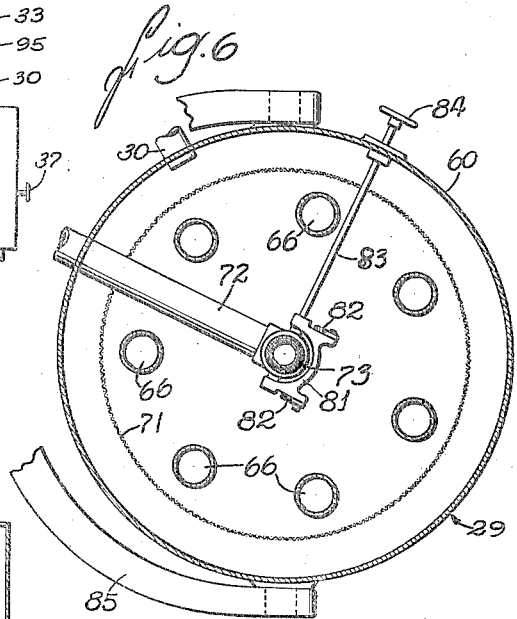
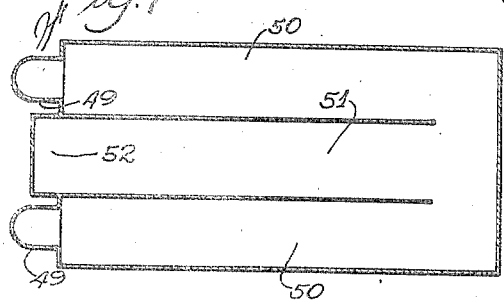
INVENTOR
George M. Etnyre
ATTORNEYS Jan. 28, 1941. G. M. ETNYRE 2,230,076
MEANS FOR REMOVING HEAVY MATERIALS FROM A TANK CAR OR THE LIKE
Filed Jan. 17, 1938 3 Sheets-Sheet 3
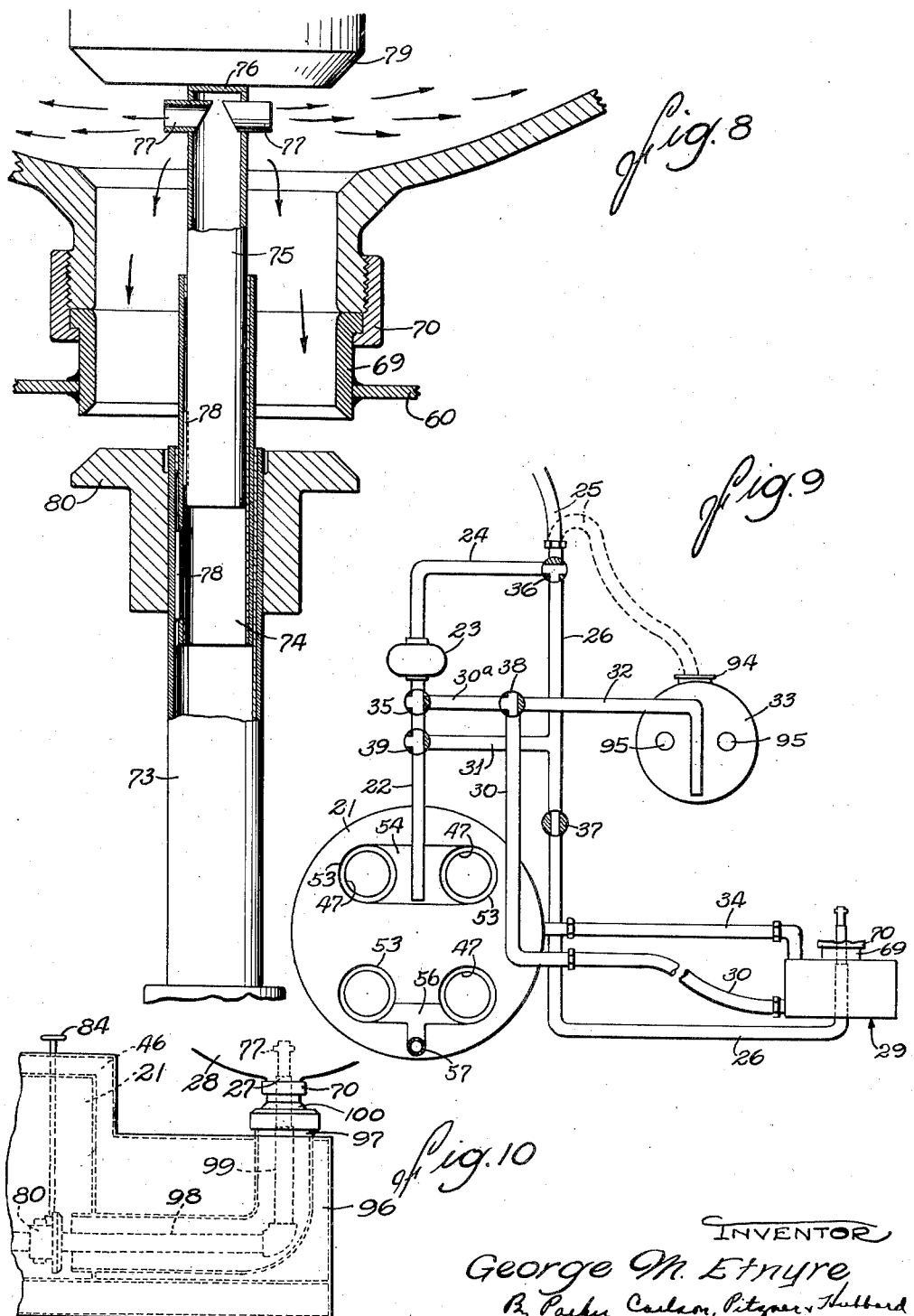
INVENTOR
George M. Etnyre
By Parker, Carlson, Pitzner & Hubbard
ATTORNEYS Patented Jan. 28, 1941

2,230,076

UNITED STATES PATENT OFFICE 2,230,076

MEANS FOR REMOVING HEAVY MATERIALS FROM A TANK CAR OR THE LIKE

George M. Etnyre, Oregon, Ill.

Application January 17, 1938, Serial No. 185,350

11 Claims. (Cl. 126—343.5)

The invention refers generally to means for removing heavy materials, such as bitumen or asphaltic substances, from tank cars, storage reservoirs or the like, and more particularly to a means for effecting such removal by the application of heat to reduce the viscosity of the relatively heavy material to a point where the material will flow freely from the reservoir.

Bitumen and similar asphaltic substances are generally stored in large tanks or are shipped in tank cars. Usually when the material is to be removed from the tank it has reached such a heavy, viscous and sometimes substantially solid condition that it will not flow from the tank, or does so very slowly. By the application of heat, the viscosity of the material may be lowered to a point at which the material will flow freely and rapidly from the tank. Heretofore, however, it has required a considerable length of time to heat the material to a free flowing condition, the transfer of heat to the material has been inefficient, which further delayed the period of heating, and the apparatus for heating the material has been large, cumbersome and relatively expensive to operate.

An object of the invention, therefore, is to provide an improved means for heating such material in a novel highly efficient manner to reduce the material rapidly to a proper condition for withdrawal from the storage tank or the like.

Another object is to provide new and improved apparatus for heating material in a tank car or other storage reservoir which embodies means for forcing a quantity of heated material into the body of the stored material.

A further object is to provide new and improved apparatus of this character embodying means for heating a relatively small quantity of material for discharge into a body of stored material to effect efficient heat transfer which produces a larger quantity of freely flowing material, and a reservoir in which material withdrawn from the storage tank may be heated for redelivery to the storage tank to continue the operative cycle or for delivery to a distributor.

More specifically stated, another object of the invention is to provide a new and improved heating apparatus for effecting a quick and efficient removal of viscous material from a tank car or the like which embodies means for preliminarily heating a small quantity of material for discharge into the body of stored material to produce a larger quantity of material in free flowing condition, and means for withdrawing such larger quantity of material from the storage tank to a reservoir having means associated therewith for efficiently reheating the material for subsequent return to the storage tank or delivery to a disposal point, the apparatus including a system of valve controlled conduits for determining the flow of material.

Other objects are to provide a heating apparatus of this character embodied in a relatively small, compact, unitary structure, to provide an efficient material preheater, and to provide novel means for quickly reheating material in a reservoir.

Other objects and advantages will become apparent in the following description and from the accompanying drawings, in which:

Figure 1 is a view in perspective on a reduced scale of a heating apparatus embodying the features of the invention.

Fig. 2 is an end elevation on a reduced scale of the apparatus in operative association with a tank car.

Fig. 3 is a vertical sectional view through an auxiliary heating reservoir which is fragmentarily illustrated in association with the outlet opening of the storage reservoir.

Fig. 4 is a vertical section through the main reservoir of the apparatus, taken substantially along the line 4—4 of Fig. 2.

Fig. 5 is a transverse vertical section through one end of the apparatus and is taken substantially along the line 5—5 of Fig. 4.

Fig. 6 is a sectional view on a horizontal plane through the auxiliary heating reservoir, taken substantially along the line 6—6 of Fig. 3.

Fig. 7 is a horizontal section on a reduced scale through the lower portion of the apparatus substantially along the line 7—7 of Fig. 5.

Fig. 8 is an axial sectional view on an enlarged scale showing the connection of the apparatus with the outlet from the storage reservoir, the section being taken as indicated by the line 8—8 of Fig. 3.

Fig. 9 is a diagrammatic view illustrating the arrangement of conduits constituting the flow system of the apparatus.

Fig. 10 is a fragmentary view showing in elevation a modified form of apparatus in which the main and auxiliary reservoirs are combined.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

According to the present invention, material in a tank car, which has been selected as representative of any type of storage reservoir, is quickly and expeditiously brought into a properly fluid condition for withdrawal by first preheating a small quantity of material to a point substantially above that at which the material will flow freely. This preheated material is then discharged through the outlet opening from the reservoir against the material in the storage tank. Since the heated material and the material to be heated are thus brought directly into intimate contact, the efficiency of heat transfer is at its maximum and, as a result, a substantial quantity of stored material will be reduced to a free flowing liquid condition. This quantity of material is withdrawn through the outlet into a reservoir where all or a part of the material is reheated. After reheating, the material is again discharged through the storage tank outlet to repeat the cycle. After a relatively few cycles of material heating, discharge thereof into the storage tank and withdrawal of fluid material, a portion of the withdrawn material may be diverted from the apparatus and delivered in a heated condition to a disposal point, herein represented by a conduit through which material may be delivered from the apparatus.

In one embodiment, the apparatus includes the following arrangement of parts, reference being had to Figs. 1 and 9. A main reservoir 21 is connected by a conduit 22 with the intake or suction side of a pump 23. The outlet or pressure side of the pump is connected to a conduit 24 which, in turn, is connected with branch conduits 25 and 26. The conduit 25 may be considered as representing the disposal point, since it is the discharge conduit leading from the apparatus. The conduit 26 is arranged to discharge material through the opening of an outlet 27 of a material storage reservoir, such as a tank car 28. Arranged to be connected with the outlet 27 is an auxiliary heating reservoir 29 into which liquefied material from the tank car may flow. From the auxiliary reservoir 29, conduits 30, 30ª lead to a connection with the conduit 22. A bypass conduit 31 joins the conduits 22 and 26, and a conduit 32 leading from a reserve reservoir or tank 33 connects with the conduits 30, 30ª from the auxiliary reservoir. An overflow conduit 34 connects the auxiliary reservoir 29 with the main reservoir 21. A valve 35 controls the junction of the conduits 30ª and 22, a valve 36 controls the junction of the conduit 24 with branch conduits 25, 26, the conduit 26 is controlled by a cut-off valve 37, the junction of the conduits 30, 30ª and 32 is controlled by a valve 38, and a valve 39 controls the junction of the by-pass conduit 31 and conduit 22. The various operative conditions and relationships of the system will be hereinafter more fully described.

For illustrative purposes, the apparatus embodying the features of the present invention is arranged, as shown in Fig. 1, in a relatively small, compact unit supported on the frame 40 of a portable vehicle trailer for convenient transportation from place to place. The main reservoir 21 is mounted on the frame and the associated parts are mounted on, or are supported by, the reservoir. Such parts include the reserve tank 33, a fuel tank 41 for a pump motor, not shown but mounted in the casing 42, and the pump which is not shown in Fig. 1, but is housed within the casing 43. A fuel tank 44 is also mounted on the reservoir to supply fuel to a series of burners 45. The auxiliary reservoir 29 is adjustably supported on the assembly.

Referring particularly to Figs. 4, 5 and 7, the main reservoir comprises a cylindrical tank of substantial capacity. The walls of the reservoir are preferably heat insulated, as at 46. Suitable means for heating the contents of the reservoir is provided, and in the present instance the preferred heating means has improved characteristics which permit substantially any quantity of material to be rapidly and efficiently heated. Thus, a pair of gas flues 47, or ducts for other heating medium if oil burners are not used, communicate with apertures 48 which open through the rear wall of the reservoir, or the left-hand wall as shown in Fig. 4. These apertures to the entrance ends of the flues are located near the top of the reservoir and from these points the flues extend in substantial parallelism through the interior of the reservoir to points near the front end thereof where the flues turn rearwardly and pass through the rear wall. Throughout this portion of their length, the flues have a gradual declination, and after passing through the rear wall turn downwardly and outwardly through U-shaped portions 49 to communicate with rearwardly leading flue continuations 50 (Fig. 5) located on opposite sides of the bottom of the reservoir. The flue continuations 50 extend nearly to the front end of the reservoir and communicate with a common duct 51 centrally located beneath the reservoir, and by which spent gas or heating medium is conducted to an exhaust stack 52.

Each of the flues 47 within the reservoir is surrounded by a jacket 53 arranged in rather closely spaced relation to the associated flue. A spacing on the order of one-half to two inches has been found suitable. The jackets 53 define flow paths for material within the reservoir, and particularly the paths through which material must flow in passing from the reservoir. At their upper ends, as shown in Fig. 5, the spaces between the flues and jackets communicate with a common chamber 54 formed in part by the end wall of the reservoir and by a hollow casing 55 located externally of the reservoir. The conduit 22 leading to the suction side of the pump communicates with this chamber 54.

At their lower ends, the jackets extend through the rear wall of the reservoir and the spaces between the jackets and flues communicate through the head of a T-shaped fitting 56. The stem of the fitting connects with a horizontal pipe 57 which opens into the lower portion of the reservoir, as at 58, and provides an intake for material to the space between the flues and jackets. The pipe 57 may be extended rearwardly to provide a drain 59 for removing all material from the reservoir. Withdrawal of material from the reservoir by means of the pump results in a flow of the material through the pipe 57 and into the space between the flues and jackets so that the material traverses substantially the entire length of the flues before it passes from the reservoir. The material, during such passage, is quickly and efficiently heated, and this result is obtained whether the reservoir is full or contains only enough material to cover the intake 58.

The auxiliary reservoir 29 serves as a means for quickly initiating operation of the apparatus and as a means for quickly increasing the temperature of a small quantity of fluid should a quantity of highly heated material be required to liquefy unusually solid particles of material. The auxiliary reservoir is in the form of a closed casing 60 (Figs. 3 and 6) having a chamber 61 provided with a false bottom 62. The chamber 61, at one side of the device, has an opening 63, to which a burner like the burners 45 (Figs. 1 and 2) may be applied. An oppositely located vent 64, controlled by a movable plate 65, enables the operator to control heating. A series of vertical flues 66 communicate with the chamber 61 and extend through the reservoir to open through the top wall thereof. The conduit 30 communicates with the lower portion of the reservoir through an aperture 67 (Fig. 3) and the overflow conduit 34 communicates with the reservoir through a fitting 68 on the top wall thereof.

On the top wall and preferably located axially of the casing is a flange 69 which projects above and below the wall and provides a conduit for material flowing through the outlet of the tank car or supply tank. The diameter of the flange, as shown, is substantially that of the outlet and such means as a nut 70, or the like, arranged for screw threaded engagement with the outlet, provides means for connecting the auxiliary reservoir to the outlet. If desired, a screen 71, or the like, may be interposed between the reservoir inlet defined by the flange 69 and the reservoir outlets through the apertures 67 and fitting 68.

The conduit 26 is, in the present embodiment, arranged to pass through the auxiliary reservoir and to discharge into the tank car through the outlet therefrom. Referring to Fig. 3, the conduit 26 communicates with a pipe 72 which extends through the lower portion of the reservoir to a point in line with the axis of the flange 69. A connecting pipe 73 extends along this axis and, as shown in Fig. 8, terminates just short of the inner end of the flange 69. Telescopically related with the end pipe 73 are pipe sections 74, 75, the latter having a closed end 76. Near this closed end, the section 75 is preferably arranged to discharge material laterally as through one or more discharge tubes 77. Keyways 78 guide the telescoping movements of the sections 74, 75 relative to pipe 73.

In use, the force of the material delivered through the conduit 26 and sections 72, 73 urges the sections outwardly as determined by the limits of the keys 78. However, if the device is used, as shown, with a tank car, the outward movement of the sections is determined by abutment of the closed end of the section 75 with the customary tank car outlet control valve 79. When the device is to be associated with a tank car, a pair of alined tubes 77 may be used and their position may be so fixed by the keys 78 that the discharged streams will be oppositely directed toward the upwardly sloping sides of the tank car. Thus, the discharged material will be forced against the body of stored material to be heated while such material, as is in condition to flow freely from the tank car, may pass through the outlet without directly opposing the incoming flow of the discharged material.

Under some conditions of operation, it may be desirable to prevent a flow of material from the tank car even during the discharge of heated material into the car. To this end, a valve 80, slidably mounted upon the upper end of the pipe 73, is arranged to coact with the inner end of the flange 69 to prevent a flow through the tank outlet. This valve may be conveniently manipulated by such means as a yoke 81 (Fig. 6) mounted on the pipe 73 and having upwardly extending arms 82 connected with the valve 80. Rocking movement may be imparted to the yoke for vertically reciprocating the valve by means of a rock shaft 83 (Fig. 6) which carries a hand wheel 84.

Since the apparatus is intended to be used at different locations, the auxiliary reservoir is so supported that its position relative to the outlet from the tank car or storage tank may be quickly and conveniently adjusted. Preferably the supporting means is arranged to locate the auxiliary reservoir in and out of the way position when the apparatus is being moved. As shown in Figs. 1 and 2, the auxiliary reservoir is, in this embodiment, pivotally mounted between the arms of a yoke 85 carried at the end of an arm 86 which is telescopically mounted in a tubular base 87. Such means as a rack and pinion arrangement 88, interposed between the arm 86 and the base 87, may be employed for extending and retracting the arm 86. The base 87 is secured through a horizontal pivot 89 to a standard 90 which is journaled between spaced brackets 91 for movement on a vertical axis. A strut 92, which includes an intermediate turn buckle 93 or the like, suspends the outer end of the arm 86 from the upper part of the standard 90. Preferably the conduits 26, 30 and 34, which lead to the auxiliary heater, are flexible and are suitably tied to the arm 86 and base 87. This arrangement permits the apparatus to be located at the side of the tank car and the adjustment of the auxiliary heater, for proper connection with the outlet 27, may be effected by proper manipulation of the rack and pinion arrangement 88 and the turn buckle 93. When the apparatus is to be moved, the auxiliary heater may be swung, as shown in Fig. 1, to an out of the way position at the side of the apparatus.

The reserve reservoir 33 is not entirely necessary, but is provided to hold a quantity of material sufficient to initiate operation of the apparatus. This quantity of material might be carried in the auxiliary heater, but in a portable unit the added weight at the end of the supporting structure would be a disadvantage. The reserve reservoir comprises a tank having a filling opening 94 and horizontal heating flues 95, to which a burner may be applied to liquefy the contents of the tank.

Referring to Fig. 10, a simplified form of apparatus is shown which may be used in localities where it is possible to position the apparatus closely adjacent to the outlet opening from the tank car or supply tank. For example, in some parts of the country, it is possible to locate the apparatus so that it will partially extend beneath the tank car. Under such circumstances, the auxiliary heater and its adjustable support are unnecessary. Instead, the main reservoir has a laterally extending continuation or extension 96 arranged and dimensioned for disposition under the outlet opening of a tank car. The upper wall of the continuation has a flange 97, similar to the flange 69 on the auxiliary heater, for connection directly to the outlet and the flange assembly preferably includes a universal joint 100 to compensate for minor misalinement. Since the extension takes the place of the auxiliary heater and internally communicates directly with the main reservoir, the conduits 30 and 34 are eliminated. The conduit 26 extends into the main reservoir and leads, as at 98, to a vertically rising pipe 99 similar to the pipe 73 in the auxiliary reservoir. The same arrangement of telescoping discharge elements, may be used on the pipe 99. The modified form of apparatus simplifies the construction and further improves heating efficiency through the elimination of lengths of exposed conduit.

In describing operation, it will be considered that the apparatus is associated with the tank car, as shown in Fig. 2, that the material in the reserve reservoir 33 has been preheated to the proper temperature by the application of portable burners (not shown) to the flues therein, and that the main reservoir and the auxiliary reservoir are empty. Referring to Fig. 9, the valve 38 is positioned to connect conduit 32 from the reserve reservoir with the conduit 30ª which leads toward the suction side of the pump. The valve 35 is set to continue this connection to the pump. The valve 36 is arranged to connect conduits 24 and 26 and the valve 37 is opened. Operation of the pump 23 draws the fluid material from the reserve tank through conduits 32, 30ª and forces it through conduits 24, 26 and pipe 73 into the body of the stored material in the tank car. Material flowing out of the tank car through the outlet 27 is received in the auxiliary heating reservoir 29, and any excess of material overflows through conduit 34 into the main reservoir. During this operation, the material in the auxiliary reservoir may be heated by a portable burner applied to the opening 63 and the burners for heating the main reservoir are started when a suitable quantity of material has accumulated in the reservoir.

After the reserve tank has been emptied, the valve 38 is set to join the conduits 30, 30ª. In this condition of the apparatus, material is drawn from the auxiliary heater 29 through the conduits 30, 30ª and discharged through conduits 24, 26 and pipe 73 into the storage tank. Again excess material returning to the auxiliary reservoir will overflow into the main reservoir. This arrangement may be employed as long as desired and, since the auxiliary reservoir may be heated during this operation, the material in the tank car will be quickly reduced to a free flowing consistency.

Following this cycle of operation, the valve 35 is turned to connect pipe 22 with the suction side of the pump. Material will then be drawn from the main reservoir through the flow passage about the highly heated flues therein and will be discharged into the tank car. It will be evident that a substantial quantity of highly heated material may be injected into the tank car particularly if the valve 80, controlling the outward movement of material from the tank car, is intermittently opened and closed. At suitable intervals the valve 36 may be manipulated to connect the conduit 24 with discharge conduit 25 to deliver material to the distributor or other apparatus. This material will, of course, be delivered in highly heated condition due to the manner in which it is drawn from the main reservoir.

After the tank car has been emptied, the material remaining in the auxiliary heater may be drawn therefrom through conduits 30, 30ª and delivered to the main reservoir through conduits 24, 26, 31 and 22, and a final portion of the material from the main reservoir will be delivered through conduits 22, 24 and 25 to refill the reserve tank.

The operation of the modified apparatus shown in Fig. 10 is substantially the same, except that conduits 30, 34 and 31 are omitted as well as their associated valves 38 and 39. Initiation of operation may use the reserve tank as previously discussed, or a reserve supply may be left in the main reservoir and the reserve tank dispensed with.

From the foregoing it will be evident that a novel method of and means for reducing a heavy viscous substance to a free flowing condition has been provided by which the desired result may be quickly obtained in a highly efficient manner. Heat losses are minimized, since the heat transfer is by direct contact of a highly heated material with the more solid material to be liquefied. The material may be expeditiously heated in the main reservoir to a suitable temperature for properly conditioning other material in the storage reservoir or for delivery from the apparatus.

I claim as my invention:

1. In apparatus for heating material in a supply tank to condition the material for free rapid flow through an outlet opening from said tank, the combination of a receptacle for material, a smaller receptacle having an inlet, means for adjustably supporting said smaller receptacle to permit connection of said inlet to said outlet opening, means for effecting such connection, a conduit system arranged to direct a flow of material into said tank through said outlet opening and thence from said smaller receptacle to said first mentioned receptacle, and means for heating the material prior to discharge thereof into said tank.

2. In apparatus for heating material in a supply tank to condition the material for free flow through an outlet opening on said tank, the combination of a receptacle for material having means for connection thereof with the outlet to receive material flowing from said tank, means for heating material in said receptacle, and material conducting means extending through said receptacle and connecting means for discharging heated material into said tank, and valve means for preventing a flow of material through said outlet into said receptacle.

3. A system for heating and removing congealed viscous material from storage tanks comprising, in combination, an auxiliary reservoir arranged to be operatively associated with an outlet opening from a storage tank and having material heating means associated with said reservoir, a main reservoir, a conduit for withdrawing heated material from said auxiliary reservoir and delivering such material to the storage tank to liquefy the material therein to a condition such that it will flow to said auxiliary reservoir, and a conduit connecting said auxiliary reservoir and said main reservoir for the delivery to said main reservoir of material in excess of the quantity used in liquefying the material in the storage tank.

4. A system for heating and removing congealed viscous material from storage tanks comprising, in combination, an auxiliary reservoir arranged to be operatively associated with an outlet opening from a storage tank and having material heating means associated with said reservoir, a main reservoir, a conduit system for withdrawing heated material from said main reservoir and delivering such material to the storage tank to liquefy the material therein to a condition such that it will flow to said auxiliary reservoir, and a conduit connecting said auxiliary reservoir and said main reservoir for the delivery of material to said main reservoir.

5. A system for heating and removing congealed viscous material from storage tanks comprising, in combination, an auxiliary reservoir arranged to be attached to an outlet opening from the lower portion of a storage tank to receive material flowing by gravity from said storage tank, a main reservoir, a conduit system for delivering heated material to the storage tank to liquefy the material therein to a condition such that it will flow by gravity to said auxiliary reservoir, and a conduit connecting said auxiliary reservoir and said main reservoir for delivering material accumulating from the storage tank to said main reservoir.

6. In a system for heating and removing congealed viscous material from a storage tank having an outlet extending downwardly from the lower portion of said tank, the combination of a reservoir attached to the outlet of said storage tank to receive material draining from said tank through said outlet, and means for discharging heated material upwardly through said outlet into contact with the congealed material in said tank to liquefy the material for drainage by gravity into said reservoir.

7. A system for heating and removing congealed viscous material from a storage tank provided with an outlet extending from the lower portion of said tank having, in combination, a reservoir connected directly to the outlet of said storage tank to receive material draining from said tank through said outlet, means for discharging heated material through said outlet into contact with the congealed material in said tank to liquefy the material for drainage by gravity into said reservoir, and means for heating the material in said reservoir.

8. A system for heating and removing heavy viscous material from storage tanks comprising, in combination, a main reservoir having material heating means associated therewith; a reserve reservoir in which material may be heated; a relatively small auxiliary reservoir arranged to be operatively associated with the outlet opening from a storage tank and in which the temperature of material may be rapidly raised; a pump; and a system of conduits connecting said reservoirs, storage tank and pump and including a first valve controlled pipe line leading from said reserve reservoir to said tank and returning through said auxiliary reservoir to said main reservoir, a second valve controlled pipe line providing a circulating flow of material leading from said auxiliary reservoir to said storage tank and returning to said auxiliary reservoir, a third valve controlled pipe line leading from said main reservoir to said storage tank and returning to said main reservoir through said auxiliary reservoir, and a fourth valve controlled material delivery pipe line leading from said main reservoir to a disposal point.

9. A system for heating and removing heavy viscous material from storage tanks comprising, in combination, a main reservoir having material heating means associated therewith; a relatively small auxiliary reservoir arranged to be operatively associated with the outlet opening from a storage tank and in which the temperature of material may be rapidly raised; a pump; and a system of conduits connecting said reservoirs, storage tank and pump and including a first valve controlled flow circulating pipe line leading from said auxiliary reservoir to said storage tank and returning to said auxiliary reservoir, a second valve controlled circuating pipe line leading from said main reservoir to said storage tank and returning to said main reservoir through said auxiliary reservoir, and a third valve controlled pipe line connected to deliver material from said main reservoir to a disposal point.

10. A system for heating and removing heavy viscous material from storage tanks comprising, in combination, a reservoir arranged to be operatively associated with the outlet opening from a storage tank, material heating means associated with said reservoir, a pump, and a system of conduits connecting said reservoir, storage tank and pump and including a valve controlled circulating pipe line leading from said reservoir to said storage tank and returning to said reservoir, and a second valve controlled pipe line connected to deliver material from said reservoir to a disposal point.

11. A system for heating and removing heavy viscous material from storage tanks comprising, in combination, a main reservoir having material heating means associated therewith; a relatively small auxiliary reservoir arranged to be operatively associated with the outlet opening from a storage tank and in which the temperature of material may be rapidly raised and a system of conduits connecting said reservoirs and storage tank including a valve controlled pipe line connected to circulate material from said main reservoir to said storage tank and back to said main reservoir through said auxiliary reservoir, and a valve controlled pipe line connected for optional delivery of material from said main reservoir to a disposal point.

GEORGE M. ETNYRE.